(12) United States Patent
Yamazaki et al.

(10) Patent No.: US 9,627,144 B2
(45) Date of Patent: Apr. 18, 2017

(54) SOLID ELECTROLYTIC CAPACITOR AND METHOD FOR MANUFACTURING SAME

(75) Inventors: Akira Yamazaki, Yokohama (JP);
Takeo Sando, Yokohama (JP); Masashi Uzawa, Yokohama (JP); Hiroaki Iriyama, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 292 days.

(21) Appl. No.: 14/238,703

(22) PCT Filed: Aug. 17, 2011

(86) PCT No.: PCT/JP2011/068596
§ 371 (c)(1),
(2), (4) Date: Feb. 12, 2014

(87) PCT Pub. No.: WO2013/024532
PCT Pub. Date: Feb. 21, 2013

(65) Prior Publication Data
US 2014/0198428 A1 Jul. 17, 2014

(51) Int. Cl.
*H01G 9/02* (2006.01)
*H01G 9/028* (2006.01)
(Continued)

(52) U.S. Cl.
CPC .......... *H01G 9/028* (2013.01); *H01G 9/0036* (2013.01); *H01G 9/15* (2013.01)

(58) Field of Classification Search
USPC ........................................ 361/525; 29/25.03
See application file for complete search history.

(56) References Cited

U.S. PATENT DOCUMENTS

| 4,780,796 A | 10/1988 | Fukuda et al. |
| 4,956,441 A | 9/1990 | Kathirgamanthan et al. |

(Continued)

FOREIGN PATENT DOCUMENTS

| CN | 1910204 A | 2/2007 |
| JP | A-61-197633 | 9/1986 |

(Continued)

OTHER PUBLICATIONS

Office Action issued Oct. 16, 2014 in Japanese Patent Application No. 2011-013637 (with English language translation).

(Continued)

*Primary Examiner* — Eric Thomas
(74) *Attorney, Agent, or Firm* — Oblon, McClelland, Maier & Neustadt, L.L.P.

(57) ABSTRACT

A solid electrolytic capacitor, including: a solid electrolytic layer; and a dielectric layer on which the solid electrolytic layer is formed. The solid electrolytic layer is formed by applying and drying a conductive-polymer solution including a conductive polymer on the dielectric layer, and the dielectric layer is formed by oxidizing a surface of an anode metal. The conductive polymer has a volume average particle size of smaller than 26 nm. A stacked aluminum electrolytic capacitor including a test solid electrolytic layer and a test dielectric layer, the test solid electrolytic layer being formed by applying and drying the conductive-polymer solution on the test dielectric layer, the test dielectric layer being formed by oxidizing a surface of aluminum having an electrical capacitance of 95 µF/cm$^2$, has a rate of exhibited capacitance of no less than 70%.

20 Claims, 2 Drawing Sheets

(51) Int. Cl.
*H01G 9/00* (2006.01)
*H01G 9/15* (2006.01)

(56) References Cited

U.S. PATENT DOCUMENTS

| | | | |
|---|---|---|---|
| 5,256,454 A | 10/1993 | Murai et al. | |
| 6,674,635 B1 * | 1/2004 | Fife | H01G 9/025 |
| | | | 361/523 |
| 7,859,829 B2 * | 12/2010 | Kakuma | H01G 9/028 |
| | | | 361/516 |
| 2008/0247119 A1 | 10/2008 | Kakuma et al. | |

FOREIGN PATENT DOCUMENTS

| | | |
|---|---|---|
| JP | A-63-039916 | 2/1988 |
| JP | A-01-301714 | 12/1989 |
| JP | B-03-061331 | 9/1991 |
| JP | A-04-032848 | 2/1992 |
| JP | A-04-268331 | 9/1992 |
| JP | A-04-328181 | 11/1992 |
| JP | A-05-503953 | 6/1993 |
| JP | A-05-178989 | 7/1993 |
| JP | A-05-504153 | 7/1993 |
| JP | A-05-226238 | 9/1993 |
| JP | A-06-032845 | 2/1994 |
| JP | A-06-056987 | 3/1994 |
| JP | A-06-087949 | 3/1994 |
| JP | A-06-145386 | 5/1994 |
| JP | A-06-256516 | 9/1994 |
| JP | A-06-293828 | 10/1994 |
| JP | A-07-041756 | 2/1995 |
| JP | A-07-048436 | 2/1995 |
| JP | A-07-118524 | 5/1995 |
| JP | A-07-196791 | 8/1995 |
| JP | A-07-324132 | 12/1995 |
| JP | A-09-022833 | 1/1997 |
| JP | A-10-012497 | 1/1998 |
| JP | B-3040113 | 5/2000 |
| JP | 2001-244151 A | 9/2001 |
| JP | 2001-283665 A | 10/2001 |
| JP | 2002-33245 A | 1/2002 |
| JP | A-2002-313684 | 10/2002 |
| JP | 2005-85947 A | 3/2005 |
| JP | 2005-252213 A | 9/2005 |
| JP | 2008-53479 A | 3/2008 |
| JP | A-2008-258307 | 10/2008 |
| JP | 2009-111105 A | 5/2009 |
| JP | A-2009-147122 | 7/2009 |
| JP | 2009239296 A * | 10/2009 |
| JP | 2009-267232 A | 11/2009 |
| JP | 2010-129651 A | 6/2010 |
| JP | 2010-272603 A | 12/2010 |
| JP | 2011-114208 A | 6/2011 |

OTHER PUBLICATIONS

Office Action issued Oct. 23, 2014 in Japanese Patent Application No. 2011-034419 (with English language translation).
International Search Report issued Nov. 15, 2011, in PCT/JP2011/068596 Filed Aug. 17, 2011.
Combined Office Action and Search Report issued Dec. 3, 2015 in Chinese Patent Application No. 201180072849.4 (with English translation of Search Report only).
Office Action issued on Jun. 7, 2016 in Japanese Patent Application No. 2011-539581 (with English language translation).
Japanese Notice of Allowance, dated Jan. 17, 2017, in Japanese Patent Application No. 2011-539581 (with English Translation).

* cited by examiner

SOLID ELECTROLYTIC CAPACITOR AND METHOD FOR MANUFACTURING SAME

CROSS REFERENCE TO RELATED APPLICATIONS

The present application is a 35 U.S.C. §371 national stage patent application of International patent application PCT/JP2011/068596, filed on Aug. 17, 2011, published as WO/2013/024532 on Feb. 21, 2013, the text of which is incorporated by reference.

FIELD OF THE INVENTION

The present invention relates to a solid electrolytic capacitor and its manufacturing method.

DESCRIPTION OF BACKGROUND ART

In recent years, solid electrolytic capacitors have been developed which are formed as follows: a solid electrolytic layer using a conductive polymer as a solid electrolyte and a cathode layer in that order are provided on the dielectric layer formed by oxidizing a surface of an anode body made of a porous valve metal such as aluminum, niobium, tantalum, titanium and magnesium (metals to form an oxidized surface layer).

Such a solid electrolytic capacitor has conductivity that is 10 to 100 times as high as the conductivity of a conventional solid electrolytic capacitor using magnesium dioxide as a solid electrolyte, and is capable of significantly reducing ESR (equivalent series resistance). Accordingly, the solid electrolytic capacitor above is expected to be used for various applications such as absorbing high-frequency noise of compact electronic devices.

In order to form a solid electrolytic layer on a dielectric layer, methods such as a chemical oxidation-polymerization and electrolytic polymerization are generally used.

A chemical oxidation-polymerization method is conducted as follows: a metal, the surface of which is oxidized to form a dielectric layer, is immersed in a solution containing the monomer of a conductive polymer such as 3,4-ethylenedioxythiophene (EDOT), pyrrole and aniline as well as an oxidizer and a dopant (conductive additive) so that the monomer and the oxidizer are directly reacted on the dielectric layer to form a solid electrolytic layer.

On the other hand, an electrolytic polymerization method is conducted as follows: a conductive base layer is formed in advance on the dielectric layer, an electrolyte solution containing the monomer of a conductive polymer and a dopant is applied onto the base layer to form a coated film, and electrical voltage is applied between the coated film and the base layer to form a solid electrolytic layer.

For example, patent publication 1 discloses a method for forming a solid electrolytic layer using a chemical oxidation-polymerization method. Specifically, on a surface of an aluminum electrode on which surface oxidation treatment is conducted, a solution in which EDOT and p-toluenesulfonic acid iron (III) both as an oxidizer and a dopant are dissolved in an organic solvent, is applied to form a polymer-coated film, and then the organic solvent is removed to obtain a solid electrolytic layer.

Also, patent publication 2 discloses the following method: a solid electrolytic layer made of polypyrrole or polyaniline formed by a chemical oxidation-polymerization method is used as a base layer, and another solid electrolytic layer made of the same material is further formed on the base layer using the electrolytic polymerization method.

However, since polymerization reactions are progressed on the dielectric layer by such a chemical oxidation-polymerization method or electrolytic polymerization method, impurities tend to be mixed into the obtained solid electrolytic layer to cause short-circuiting. In addition, the manufacturing process tends to be complex.

Thus, a polymer slurry coating method is proposed to form a solid electrolytic layer without conducting chemical oxidation-polymerization or electrolytic polymerization on the dielectric layer. In such a polymer slurry coating method, a monomer is polymerized in advance to form a polymer (conductive polymer), and a dispersion containing the polymer is applied on the dielectric layer and dried to form a coating film so that a solid electrolytic layer is obtained.

Since, unlike other chemical oxidation-polymerization or electrolytic polymerization methods which carry out polymerization reactions on the dielectric layer, a polymer slurry coating method uses a conductive polymer with completed polymerization by chemically oxidizing a monomer, oxidizer and dopant in advance. Therefore, no polymerization reactions are necessary to be carried out on the dielectric layer, and fewer impurities are mixed into the solid electrolytic layer, making it relatively easy to control the manufacturing process.

However, when a polymer slurry coating method is used, it is difficult to impregnate the dispersion of the conductive polymer deep into the dielectric layer. As a result, a solid electrolytic layer tends to be formed only on the surface layer of the dielectric layer and not inside the fine irregularities (fine pores), thus causing problems such as a lower rate of exhibited capacitance of the obtained solid electrolytic capacitor.

Therefore, another method is proposed to form a solid electrolytic layer by using a conductive polymer soluble in water or organic solvents.

For example, patent publication 3 discloses a method in which a polymer solution obtained by dissolving a certain soluble aniline-based conductive polymer in water or a hydro-organic solvent is applied and dried on a dielectric layer formed by oxidizing the surface of a metal so that a solid electrolytic layer is formed.

PRIOR ART PUBLICATION

Patent Publication

Patent publication 1: Japanese Patent Publication 3040113
Patent publication 2: Japanese Examined Patent Publication H3-61331
Patent publication 3: Japanese Published Unexamined Patent Application H9-22833

SUMMARY OF THE INVENTION

Problem(s) to be Solved by the Invention

However, since solid electrolytic capacitors have become more miniaturized and lightweight while exhibiting greater capacitance in recent years, porous metals with surface oxide layers are likely to be made finer with various shapes of fine pores. Accordingly, the interiors of dielectric layers formed on surfaces of such metals are even finer and complex. Thus, to impregnate conductive polymers into such dielectric layers, simply using a polymer solution as described in patent publication 3 was not sufficient to achieve the intended purpose.

Roughly speaking, solid electrolytic capacitors are structured as stacked types or rolled types. For a rolled-type solid electrolytic capacitor, it is especially difficult to sufficiently impregnate a polymer solution in the separator, made of fiber or paper, that is provided between the dielectric layer and the cathode. Especially when an insulation oil has seeped into a separator, a polymer solution is hard to impregnate into the separator.

The present invention was carried out in consideration of the above problems. Its objective is to provide a solid electrolytic capacitor where a conductive polymer is well impregnated inside an anode with a dielectric layer (metal with a surface oxide layer), and to provide a method for manufacturing a solid electrolytic capacitor using a simplified process for impregnating a conductive polymer deep inside an anode with a dielectric layer (metal with a surface oxide layer).

Solution(s) to the Problem(s)

As a result of intensive studies, the inventors of the present invention have found that impregnation into the fine irregularities of a dielectric layer is significantly improved by regulating the average particle size and the like of a conductive polymer, and have completed the present invention.

Namely, a solid electrolytic capacitor according to an embodiment of the present invention is characterized by a solid electrolytic layer which is formed by applying and drying a conductive-polymer solution which contains a conductive polymer that satisfies following condition (A) and which meets following condition (B), to a dielectric layer formed by oxidizing the surface of an anode metal.

Condition (A): Out of one or more peaks that appear when particle size distributions are measured by a dynamic light-scattering method using a conductive-polymer solution containing 1 mass % conductive polymer, the volume average particle size in the distribution that includes the peak of the smallest particle size is smaller than 26 nm.

Condition (B): A conductive-polymer solution containing the conductive polymer is applied and dried to provide a solid electrolytic layer on the dielectric layer formed by oxidizing a surface of aluminum with an electrical capacitance of 95 µF/cm², and when a stacked aluminum electrolytic capacitor is formed using the solid electrolytic layer, the rate of exhibited capacitance of the stacked aluminum electrolytic capacitor is no less than 70%.

The amount of a conductive polymer in the conductive-polymer solution is preferred to be 9 mass % or less.

In addition, the surface tension of the conductive-polymer solution is preferred to be less than 67 mN/m.

Moreover, the conductive-polymer solution is preferred to contain a surfactant.

Also, the conductive-polymer solution is preferred to contain a repeating unit as expressed in the following general formula (1).

[chemical formula 1]

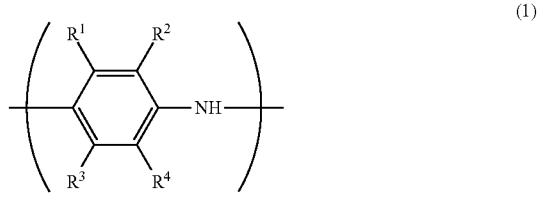

In formula (1), $R^1$ to $R^4$ are each independently, —H, a straight or branched chain alkyl group having 1 to 24 carbon atoms, a straight or branched chain alkoxy group having 1 to 24 carbon atoms, an acidic group or its salt, a hydroxyl group, a nitro group, —F, —Cl, —Br or —I. At least one out of $R^1$ to $R^4$ is an acidic group or its salt. Here, an acidic group indicates either a sulfonic group or a carboxylic group.

Also, a method for manufacturing a solid electrolytic capacitor according to an embodiment of the present invention is characterized by the following: a step for applying a conductive-polymer solution which contains a conductive polymer that satisfies following condition (A) and which meets following condition (B), to a dielectric layer formed by oxidizing the surface of an anode metal; and a step for forming a solid electrolytic layer by drying the coated conductive-polymer solution.

Condition (A): Out of one or more peaks that appear when particle size distributions are measured by a dynamic light-scattering method using a conductive-polymer solution containing 1 mass % conductive polymer, the volume average particle size in the distribution that includes the peak of the smallest particle size is smaller than 26 nm.

Condition (B): A conductive-polymer solution containing the conductive polymer is applied and dried to provide a solid electrolytic layer on the dielectric layer formed by oxidizing a surface of aluminum with an electrical capacitance of 95 µF/cm², and when a stacked aluminum electrolytic capacitor is formed using the solid electrolytic layer, the rate of exhibited capacitance of the stacked aluminum electrolytic capacitor is no less than 70%.

The amount of a conductive polymer in the conductive-polymer solution is preferred to be 9 mass % or less.

In addition, the surface tension of the conductive-polymer solution is preferred to be less than 67 mN/m.

A method for manufacturing a solid electrolytic capacitor according to an embodiment of the present invention is characterized by the following: a step for applying an organic solvent or a mixed solvent of water and organic solvent to a dielectric layer formed by oxidizing a surface of an anode metal; a step for applying a conductive-polymer solution containing a conductive polymer to the dielectric layer on which an organic solvent or a mixed solvent of water and organic solvent is coated; and a step for forming a solid electrolytic layer by drying the coated conductive-polymer solution.

Here, it is preferred that the conductive polymer satisfy condition (A) below and that the conductive-polymer solution satisfy condition (B) below.

Condition (A): Out of one or more peaks that appear when particle size distributions are measured by a dynamic light-scattering method using a conductive-polymer solution containing 1 mass % conductive polymer, the volume average particle size in the distribution that includes the peak of the smallest particle size is smaller than 26 nm.

Condition (B): A conductive-polymer solution containing the conductive polymer is applied and dried to provide a solid electrolytic layer on the dielectric layer formed by oxidizing a surface of aluminum with an electrical capacitance of 95 μF/cm², and when a stacked aluminum electrolytic capacitor is formed using the solid electrolytic layer, the rate of exhibited capacitance of the stacked aluminum electrolytic capacitor is no less than 70%.

The amount of a conductive polymer in the conductive-polymer solution is preferred to be 9 mass % or less.

In addition, the surface tension of the conductive-polymer solution is preferred to be less than 67 mN/m.

Effects of the Invention

In a solid electrolytic capacitor according to an embodiment of the present invention, the conductive polymer is sufficiently impregnated all the way into the anode body (anode metal) with a dielectric layer.

Also, according to the method for manufacturing a solid electrolytic capacitor of the present invention, a solid electrolytic capacitor where a conductive polymer is sufficiently impregnated into the anode body (anode metal) with a dielectric layer is manufactured by a simplified process.

MODE TO CARRY OUT THE INVENTION

The embodiments of the present invention are described in detail in the following.

In the present application, a "conductive polymer" indicates a conductive polymer or a conductive polymer and a dopant; and a "conductive-polymer solution" indicates a solution in which a conductive polymer, or a conductive polymer and a dopant, is dissolved or dispersed.

In addition, "impregnated" in the present application indicates a conductive polymer has seeped (infiltrated) into the fine irregularities of the dielectric layer, or indicates to what degree a conductive polymer has seeped (infiltrated) into fine irregularities of the dielectric layer.

The degree of impregnation in a capacitor is evaluated relatively by observing a cross section of the capacitor through a scanning electron microscope or the like.

<Solid Electrolytic Capacitor>

A solid electrolytic capacitor according to an embodiment of the present invention is described below.

Figure 1:
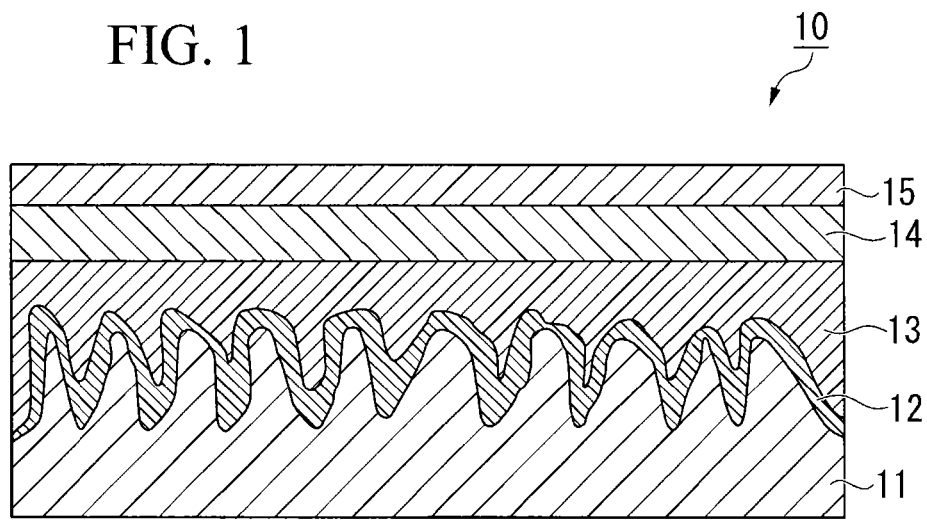
FIG. 1 schematically shows a cross-sectional view of an example of the solid electrolytic capacitor according to an embodiment of the present invention.

FIG. 1 schematically shows the structure of a solid electrolytic capacitor of the present embodiment. Solid electrolytic capacitor 10 of the present embodiment is a stacked solid electrolytic capacitor structured to have anode metal 11 for forming an oxide layer, dielectric layer 12 formed by oxidizing anode metal 11, solid electrolytic layer 13 formed on dielectric layer 12, graphite layer 14 formed on solid electrolytic layer 13, and metal layer 15 formed on graphite layer 14.

(Anode Metal)

Anode metal 11 for forming an oxide layer is a conductive porous valve metal. For such anode metal 11, an electrode made of metal material usually used for a solid electrolytic capacitor (valve metal) is listed, in particular, aluminum, tantalum, niobium, nickel and the like, in a form of metal foil, sintered metal or the like.

In the present application, being "conductive" means having a volume resistivity of $10^9$ Ω·cm or lower.

(Dielectric Layer)

Dielectric layer 12 is formed through anodic oxidation of anode metal 11.

Dielectric layer 12 obtained through anodic oxidation of anode metal 11 reflects the surface condition of anode metal 11 as shown in FIG. 1, thus having fine irregularities. The cycle of such irregularities depends on the type of anode metal 11, and it is usually 200 nm or less. In addition, since the depth of concave portions (fine pores) of the irregularities especially depends on the type or the like of anode metal 11, it is not easily determined. When aluminum is used, for example, the depth of concave portions is approximately a few dozen nm to 1 μm.

(Solid Electrolytic Layer)

Solid electrolytic layer 13 is formed by applying a conductive-polymer solution which contains a conductive polymer that satisfies following condition (A) and which meets following condition (B), and by drying the solution.

Condition (A): Out of one or more peaks that appear when particle size distributions are measured by a dynamic light-scattering method using a conductive-polymer solution containing 1 mass % conductive polymer, the volume average particle size in the distribution that includes the peak of the smallest particle size is smaller than 26 nm.

Condition (B): A conductive-polymer solution containing the conductive polymer is applied and dried to provide a solid electrolytic layer on the dielectric layer formed by oxidizing a surface of aluminum with an electrical capacitance of 95 μF/cm², and when a stacked aluminum electrolytic capacitor is formed using the solid electrolytic layer, the rate of exhibited capacitance of the stacked aluminum electrolytic capacitor is no less than 70%.

A conductive polymer used in an embodiment of the present invention has a volume average particle size smaller than 26 nm. If the volume average particle size is smaller than 26 nm, since the polymer is impregnated sufficiently into the fine irregularities of dielectric layer 12, the obtained solid electrolytic capacitor exhibits high capacitance. To achieve better impregnation, the volume average particle size of a conductive polymer is preferred to be no greater than 20 nm, more preferably no greater than 10 nm, and even particularly more preferably no greater than 5 nm.

The volume average particle size of a conductive polymer is measured as follows.

First, a conductive-polymer solution with a conductive polymer concentration of 1 mass % is prepared, and particle size distributions are obtained by a dynamic light-scattering method using a light-scattering type particle size analyzer, and the values are corrected by the viscosity of pure water. Out of one or more peaks, the volume average particle size is obtained from the distribution that includes the peak of the smallest particle size, and is set as the volume average particle size of the conductive polymer.

Figure 3:
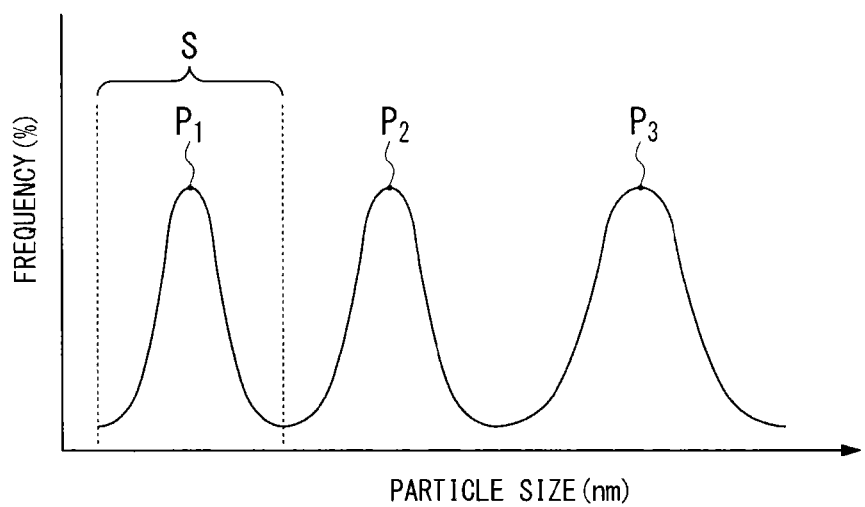
FIG. 3 schematically shows particle distributions of a conductive polymer measured by a dynamic light-scattering method.

In the present application, "smallest particle size distribution" means the distribution of the smallest particle size among one or more particle size distributions obtained by measuring particle size distributions by a dynamic light-scattering method, which is then corrected by the viscosity of pure water and analyzed. More specifically, the smallest particle size distribution means a particle size distribution that includes peak $P_1$ of the smallest particle size among one or more peaks $P_1$, $P_2$, $P_3$, . . . obtained by measuring particle size distributions (the region of (S) in FIG. 3). If there is one peak when particle size distributions are measured by a dynamic light-scattering method, then that one particle distribution is set as the smallest particle size distribution. In addition, if multiple particle size distributions overlap with each other, their spectrum waveforms are separated by a generally employed analytical method using the Gaussian or Lorentzian function included in a general purpose software.

Solid electrolytic layer 13 of solid electrolytic capacitor 10 of the present embodiment is formed by using a conductive-polymer solution containing a conductive polymer. When the conductive-polymer solution is applied and dried to form a solid electrolytic layer on a dielectric layer formed by oxidizing a surface of aluminum having electric capacitance per unit area of 95 µF/cm², and when a stacked aluminum electrolytic capacitor is formed using the solid electrolytic layer, the rate of exhibited capacitance of the stacked solid electrolytic capacitor is no less than 70%. When solid electrolytic layer 13 is formed by using a conductive-polymer solution that can provide a rate of capacitance to be exhibited at no less than 70%, since the conductive polymer can be sufficiently impregnated into the irregularities of dielectric layer 12, a solid electrolytic capacitor with high capacitance is achieved.

The rate of exhibited capacitance is obtained as follows.

First, an anodic oxide layer is formed on an aluminum surface having an electrical capacitance per unit area of 95 µF/cm², and the layer is immersed in an ammonium adipate solution with a concentration of 3 mass % to measure the electric capacitance in the solution. The obtained value is set as the maximum capacitance (Cw).

A stacked aluminum solid electrolytic capacitor is prepared separately as described above and its capacitance (Cs) is measured. The rate of exhibited capacitance in the stacked solid aluminum electrolytic capacitor is obtained by the formula below.

rate of exhibited capacitance (%)=(Cs/Cw)×100 (i)

The rate of exhibited capacitance in a stacked aluminum electrolytic capacitor can be adjusted by the amount or the like of the conductive polymer in a conductive-polymer solution. In particular, a reduction in the amount of the conductive polymer in a conductive-polymer solution tends to result in a higher rate of exhibited capacitance in a stacked aluminum solid electrolytic capacitor.

It is preferred to use a conductive polymer that is soluble in water or in an organic solvent. If a conductive polymer is soluble, a conductive-polymer solution is formed by dissolving the conductive polymer in water or in an organic solvent. Accordingly, by a simplified method such as using the conductive-polymer solution to apply and dry to a dielectric layer 12, a solid electrolytic layer 13 is formed where the conductive polymer is sufficiently impregnated into the fine irregularities of dielectric layer 12.

As for a soluble conductive polymer, it is not limited specifically as long as it is dissolved in water or in an organic solvent. For example, a conductive polymer with sulfonic-acid group (—SO₃H) and/or carboxyl group (—COOH) is preferred considering solubility. Here, a sulfonic acid group and carboxyl group contained in a soluble conductive polymer may be an acid state (—SO₃H, —COOH) or may be ionic (—SO₃⁻, —COO⁻).

In the present application, "soluble" means that 0.1 gram or more of a substance dissolves homogeneously in 10 grams of water or organic solvent (liquid temperature of 25° C.).

As for a conductive polymer, it is preferred to be a compound containing a repeating unit expressed by a general formula (1) below.

[chemical formula 2]

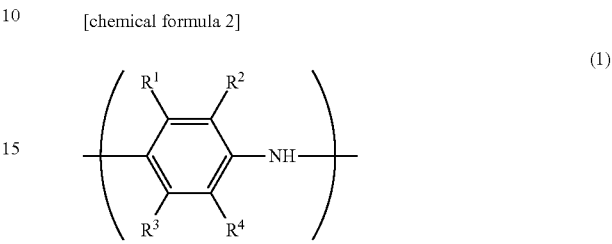

In formula (1), $R^1$ to $R^4$ are each independently, —H, a straight or branched chain alkyl group having 1 to 24 carbon atoms, a straight or branched chain alkoxy group having 1 to 24 carbon atoms, an acidic group or its salt, a hydroxyl group, a nitro group, —F, —Cl, —Br or —I. At least one out of $R^1$ to $R^4$ is an acidic group or its salt.

Here, "acidic group" indicates either a sulfonic group or carboxyl group. Namely, in formula (1), at least one out of $R^1$ to $R^4$ is —SO₃H, —SO₃⁻, —COOH or —COO⁻. Especially, when simplified manufacturing is considered, it is preferred that any one of $R^1$ to $R^4$ be a straight or branched chain alkoxy group having 1 to 4 carbon atoms, another one be —SO₃⁻ or SO₃H, and the rest be H.

In addition, "salt of an acidic group" means at least one type among alkali metal salts, ammonium salts and substituted ammonium salts of the acidic group.

A conductive polymer is preferred to contain a repeating unit expressed as in general formula (1) above at 20 to 100 mol %, more preferably at 50 to 100 mol %, among all the repeating units (100 mol %) of the conductive polymer. Especially, it is preferred to contain 100 mol % because such a setting leads to excellent solubility in water or in an organic solvent regardless of pH value.

In addition, from a viewpoint of excellent conductivity, the conductive polymer is preferred to contain 10 or more repeating units expressed in general formula (1) in one molecule.

As a compound having a repeating unit expressed in formula (1) above, poly(2-sulfo-5-methoxy-1,4-iminophenylene) is especially preferred from a viewpoint of excellent solubility.

The mass average molecular weight of a conductive polymer is preferred to be 3000 to 1000000, more preferably 3000 to 300000, even more preferably 3000 to 100000. If the mass average molecular weight of a conductive polymer is 3000 or more, excellent conductivity, film formability and film strength are achieved. If the mass average molecular weight of a conductive polymer is 1000000 or less, excellent solubility in water or in an organic solvent is achieved.

The mass average molecular weight of a conductive polymer is a value measured using gel permeation chromatography (GPC) and then converted in terms of sodium polystyrene sulfonate.

A conductive polymer is obtained by various synthetic methods such as chemical polymerization and electrolytic polymerization. In addition, a conductive polymer may also be obtained using synthetic methods described in Japanese Published Unexamined Patent Application Nos. H07-196791 and H07-324132, for example.

As described above, solid electrolytic layer 13 is formed when a conductive-polymer solution which contains a conductive polymer that satisfies condition (A) above and which meets condition (B) above is applied and dried on dielectric layer 12. In solid electrolytic layer 13, the conductive polymer is sufficiently impregnated into the fine irregularities of dielectric layer 12, thus enhancing the rate of capacitance exhibited in the obtained solid electrolytic capacitor 10.

The amount of the conductive polymer in 100 mass % of the conductive-polymer solution is preferred to be no greater than 9 mass %, more preferably no greater than 5 mass %. If the amount of the conductive polymer is no greater than 9 mass %, its wettability is enhanced when applied on anode metal 11 on which dielectric layer 12 is formed or on a separator provided in a later-described rolled-type solid electrolytic capacitor. Accordingly, the conductive polymer is not deposited on the surface of dielectric layer 12 but is impregnated sufficiently into the fine irregularities.

The lower limit of the amount of the conductive polymer is not limited specifically, but it is preferred to be 0.1 mass % or greater when considering the ease of forming solid electrolytic layer 13 with a desired thickness.

In addition, the surface tension of a conductive-polymer solution is preferred to be less than 67 mN/m, more preferably 60 mN/m or less. If the surface tension of a conductive-polymer solution is less than 67 mN/m, its wettability is enhanced when applied on anode metal 11 on which dielectric layer 12 is formed or on a separator provided in a later-described rolled-type solid electrolytic capacitor. Accordingly, the conductive polymer is not deposited on the surface of dielectric layer 12 but is impregnated sufficiently into the fine irregularities.

The lower limit of the surface tension of the conductive polymer is not limited specifically, but it is preferred to be 20 mN/m or greater.

Other than the conductive polymer, a conductive-polymer solution used for forming solid electrolytic layer 13 may also contain materials such as another conductive polymer, additives such as a surfactant and the like.

As for another conductive polymer, poly (3,4-ethylenedioxythiophene), polypyrrole, polyaniline, or the like may be used. Also, when another conductive polymer is contained, it is preferred to be combined with a dopant (such as polystyrene sulfonic acid).

As for a surfactant, anionic surfactants, cationic surfactants, amphoteric surfactants, nonionic surfactants, fluorine-based surfactants and the like may be used.

Examples of anionic surfactants include, for example, alkyl sulfonic acid, alkyl benzene sulfonic acid, alkyl carboxylic acid, alkyl naphthalene sulfonic acid, α-olefin sulfonic acid, dialkyl sulfosuccinic acid, α-sulfonated fatty acid, N-methyl-N-oleyltaurine, petroleum sulfonic acid, alkyl sulfonic acid, sulfated oil, polyoxyethylene alkyl ether sulfonic acid, polyoxyethylene styrenated phenyl ether sulfonic acid, alkyl phosphoric acid, polyoxyethylene alkyl ether phosphoric acid, polyoxyethylene alkyl phenyl ether phosphoric acid, naphthalene sulfonic acid formaldehyde condensate, and their salts.

Examples of cationic surfactants include, for example, primary through tertiary aliphatic amines, quaternary ammonium, tetraalkylammonium, trialkyl benzyl ammonium alkyl pyridinium, 2-alkyl-1-alkyl-1-hydroxyethyl imidazolinium, N,N-dialkyl morpholinium, polyethylene polyamine fatty acid amide, urea condensate of polyethylene polyamine fatty acid amide, quaternary ammonium urea condensate of polyethylene polyamine fatty acid amide, and their salts.

Examples of amphoteric surfactants include, for example, betaines such as N,N-dimethyl-N-alkyl-N-carboxymethyl ammonium betaine, N,N,N-trialkyl-N-sulfoalkylene ammonium betaine, N,N-dialkyl-N,N-bispolyoxyethylene ammonium sulfate betaine, 2-alkyl-1-carboxymethyl-1-hydroxyethyl-imidazolinium betaine; and aminocarboxylic acids such as N,N-dialkylaminoalkylene carboxylate.

Examples of nonionic surfactants include, for example, polyoxyethylene alkyl ether, polyoxyethylene alkyl phenyl ether, polyoxyethylene polystyryl phenyl ether, polyoxyethylene polyoxypropylene glycol, polyoxyethylene polyoxypropylene alkyl ether, partial fatty acid ester of polyhydric alcohol, partial fatty acid ester of polyoxyethylene polyhydric alcohol, polyoxyethylene fatty acid ester, polyglycerol fatty acid ester, polyoxyethylated castor oil, fatty acid diethanolamide, polyoxyethylene alkylamine, partial fatty acid triethanolamine ester, trialkyl amine oxide and the like.

Examples of fluorine-based surfactants include, for example, fluoroalkyl carboxylic acid, perfluoroalkyl carboxylic acid, perfluoroalkyl benzene sulfonic acid, perfluoroalkyl polyoxyethylene ethanol, and the like.

Here, alkyl groups are preferred to have 1 to 24 carbon atoms, more preferably 3 to 18 carbon atoms.

Those surfactants may be used alone or in combination thereof.

When a conductive-polymer solution contains a surfactant, the amount of the surfactant is preferred to be 0.1 to 20 mass %, more preferably 0.1 to 5 mass %, in 100 mass % of the conductive-polymer solution. If the amount of a surfactant is 0.1 mass % or greater, the surface tension of the conductive-polymer solution is lowered, thus improving impregnation into the fine irregularities of the dielectric layer 12. Accordingly, the conductivity of a solid electrolytic layer 13 is enhanced. On the other hand, if the amount of a surfactant is no greater than 20 mass %, excellent conductivity is maintained.

(Graphite Layer)

Graphite layer 14 is formed by applying a graphite solution to a solid electrolytic layer 13, or by immersing in a graphite solution an anode metal 11 on which a dielectric layer 12 and a solid electrolytic layer 13 are formed in that order.

(Metal Layer)

In addition to a silver layer such as silver paste, electrodes made of aluminum, tantalum, niobium, titanium, zirconium, magnesium, hafnium and the like may also be used as a metal layer 15.

In a solid electrolytic capacitor 10 as described above according to an embodiment of the present invention, a solid electrolytic layer 13 is formed using a conductive-polymer solution which contains a conductive polymer that satisfies condition (A) above and which meets condition (B) above. Accordingly, the conductive polymer is sufficiently impregnated into the fine irregularities of the dielectric layer 12. Accordingly, the solid electrolytic layer 13 is formed even among the fine irregularities of the dielectric layer 12, thus increasing the rate of exhibited capacitance.

<Method for Manufacturing Solid Electrolytic Capacitor>

Next, a method for manufacturing a solid electrolytic capacitor 10 above is described.

The method for manufacturing a solid electrolytic capacitor according to an embodiment of the present invention includes the following: a step for applying (application step) a conductive-polymer solution which contains a conductive polymer that satisfies condition (A) above and which meets condition (B) above, to a dielectric layer 12 formed by oxidizing a surface of an anode metal 11; and a step for drying (drying step) the coated conductive-polymer solution to form a solid electrolytic layer 13.

In the present application, steps other than those for forming a solid electrolytic layer 13 are performed using a well-known technology. For example, when a solid electrolytic capacitor 10 is formed as shown in FIG. 1, the surface layer and its vicinity of an anode metal 11 such as aluminum foil are etched to make it porous, and a dielectric layer 12 is formed through anodic oxidation. Then, after a solid electrolytic layer 13 is formed on the dielectric layer 12, the solid electrolytic layer 13 is dipped in a graphite solution, or a graphite solution is coated so that graphite layer 14 is formed on the solid electrolytic layer 13. Then, a metal layer 15 is formed on the graphite layer 14. Further, the cathode and anode (neither is shown) are connected to external terminals (not shown) and the exterior is finished to obtain a solid electrolytic capacitor 10.

Here, procedures for forming a solid electrolytic layer 13 are described in detail.

A solid electrolytic layer 13 is formed by the following steps: on a dielectric layer 12 formed on a surface of an anode metal 11, a step for applying (application step) a conductive-polymer solution which contains a conductive polymer that satisfies condition (A) above and which meets condition (B) above; and after the conductive polymer is impregnated into fine irregularities of the dielectric layer 12, a step for drying (drying step) the coated conductive-polymer solution.

In the embodiments of the present invention, "application" indicates forming a coated film (layer), and includes coating and impregnation.

A conductive-polymer solution is obtained by dissolving in a solvent a conductive polymer, along with another conductive polymer, a dopant, and additives such as a surfactant, if necessary.

In an embodiment of the present invention, a conductive-polymer solution is prepared by adjusting the amount of the conductive polymer at no greater than 9 mass %, more preferably no greater than 5 mass %, in 100 mass % of the conductive-polymer solution.

If the amount of the conductive polymer is no greater than 9 mass %, the conductive-polymer solution exhibits enhanced wettability on the anode metal 11 on which dielectric layer 12 is formed or on a separator provided in a later-described rolled-type solid electrolytic capacitor. Accordingly, the conductive polymer is not deposited on the surface of dielectric layer 12 but is impregnated sufficiently into the fine irregularities.

The lower limit of the amount of the conductive polymer is not limited specifically, but it is preferred to be 0.1 mass % or greater when considering the ease of forming solid electrolytic layer 13 with a desired thickness.

In another embodiment of the present invention, the surface tension of a conductive-polymer solution is preferred to be less than 67 mN/m, more preferably 60 mN/m or less. If the surface tension of a conductive-polymer solution is less than 67 mN/m, its wettability is enhanced when applied on anode metal 11 on which dielectric layer 12 is formed or on a separator provided in a later-described rolled-type solid electrolytic capacitor. Accordingly, the conductive polymer is not deposited on the surface of dielectric layer 12 but is impregnated sufficiently into the fine irregularities.

The lower limit of the surface tension of the conductive polymer is not limited specifically, but it is preferred to be 20 mN/m or greater.

The surface tension of a conductive-polymer solution is set by adjusting the type and amount of a conductive polymer, the type of a solvent and the like.

A solvent to be used for a conductive-polymer solution is water, an organic solvent or a mixed solvent of water and an organic solvent; a detailed description is provided later. When a mixed solvent is used, for example, the surface tension of the conductive-polymer solution tends to decrease as the ratio of the organic solvent increases.

In addition, the surface tension of a conductive-polymer solution is adjusted by adding a surfactant described above. Especially, when only water is used as a solvent, the surface tension of the conductive-polymer solution is likely to be higher. In such a case, the surface tension is lowered by adding a surfactant.

The surface tension of a conductive-polymer solution is a value measured by a plate method (Wilhelmy method) using an automatic surface tension meter.

That is, the gauge (a platinum plate) is immersed in a solution to be measured, and when the force by which the solution pulls the gauge (surface tension) is balanced with the force of the spring to which the gauge is fixed, the surface tension is measured from the displacement at which the gauge is sunk in the solution.

As described above, water, an organic solvent, or a mixed solvent of water and organic solvent can be used as a solvent for a conductive-polymer solution.

Examples of organic solvents are alcohols such as methanol, ethanol, isopropyl alcohol, propyl alcohol and butanol; ketones such as acetone, methyl ethyl ketone, ethyl isobutyl ketone and methyl isobutyl ketone; ethylene glycols such as ethylene glycol, ethylene glycol methyl ether, ethylene glycol mono-n-propyl ether; propylene glycols such as propylene glycol, propylene glycol methyl ether, propylene glycol ethyl ether, propylene glycol butyl ether, and propylene glycol propyl ether; amides such as dimethylformamide, and dimethylacetamide; pyrrolidones such as N-methylpyrrolidone, and N-ethylpyrrolidone; hydroxy esters such as methyl lactate, ethyl lactate, methyl β-methoxyisobutyrate, and methyl α-hydroxyisobutyrate; and γ-butyrolactone.

Those organic solvents may be used alone or in combination thereof. Among them, alcohols, especially methanol and isopropyl alcohol, are preferred from the viewpoints of solubility in water and ease of handling.

When a mixed solvent is used, the amount of the organic solvent in 100 mass % of the mixed solvent is preferred to be 4 to 70 mass %, more preferably 10 to 50 mass %. When the amount of the organic solvent is within such a range, a conductive polymer dissolves well.

Methods for applying a conductive-polymer solution are, for example, dip coating, brushing, spin coating, casting, micro gravure coating, gravure coating, bar coating, roll coating, wire bar coating, spray coating, flow coating, screen printing, flexographic printing, offset printing, ink-jet printing and the like. Among those, dip coating (immersion method) is especially preferred due to the ease of operation.

When a conductive-polymer solution is applied using a dip coating method, the duration for immersing in the conductive-polymer solution is preferred to be 1 to 30 minutes from the viewpoint of operational efficiency. In addition, dip coating may also be effective if the pressure is reduced while dipping and then returned to normal, or pressure is added while dipping.

When using a spray coating method or the like, the conductive polymer can be impregnated into the fine irregularities of a dielectric layer 2 when external physical force is added. However, in such a method, initial investment of mechanical equipment may be high, or the utilization rate of the conductive polymer may be low because the conductive-polymer solution tends to scatter in portions other than the dielectric layer 12.

By contrast, according to the embodiment of the present invention, since application is conducted using a conductive-polymer solution as described above, it is easier to impregnate the conductive polymer into the fine irregularities of the dielectric layer 12. As a result, a conductive-polymer solution is applied by a dip coating method, which is economically effective, since, unlike a spray coating method and the like, the operation is simplified, hardly any initial investment is necessary, and the conductive polymer is utilized without waste.

As a drying method after the application of the conductive-polymer solution, heat drying is preferred. However, air drying, physical drying by spinning the coated metal or the like may also be employed.

The drying conditions are determined according to the type of conductive polymer and solvent. Usually, the drying temperature is preferred to be 20 to 190° C., and, from the viewpoint of the result of the drying, the duration of drying is preferred to be 1 to 30 minutes.

In the method for manufacturing a solid electrolytic capacitor described above according to an embodiment of the present invention, since a conductive-polymer solution, which contains a conductive polymer that satisfies condition (A) above and which meets condition (B) above, is applied on a dielectric layer formed by oxidizing the anode metal to form a solid electrolytic layer, the conductive polymer is sufficiently impregnated into the fine irregularities of the dielectric layer. Accordingly, a solid electrolytic layer with high conductivity is formed on the dielectric layer, and a solid electrolytic capacitor with a high rate of exhibited capacitance is manufactured by a simplified procedure.

Especially, when the amount of the conductive polymer in a conductive-polymer solution and the surface tension of the conductive-polymer solution are adjusted to specific values, it is even easier to impregnate the conductive polymer into the fine irregularities of the dielectric layer.

Moreover, since porous anode metals have been made even finer with various shapes of fine pores in recent years, the interiors of dielectric layers are becoming finer and more complex accordingly. However, according to the embodiment of the present invention, a conductive polymer is sufficiently impregnated into an even finer and more complex dielectric layer.

As a result, in a solid electrolytic capacitor obtained by the embodiment of the present invention, a solid electrolytic layer is formed on the dielectric layer, where a conductive polymer is sufficiently impregnated into the fine irregularities. Thus, a rate of capacitance to be exhibited is high, leading to excellent capacitor performance.

In addition, according to the embodiment of the present invention, a solid electrolytic layer is formed without conducting chemical-oxidation polymerization or electrolytic polymerization on the dielectric layer. Accordingly, impurities are less likely to be mixed into the solid electrolytic layer, and the manufacturing method is simplified.

In the above, aluminum was used as an anode metal. However, that is not the only option, and other metals such as tantalum, niobium and nickel plating may also be used.

<Other Embodiments>

The method for manufacturing a solid electrolytic capacitor according to an embodiment of the present invention is not limited to the embodiment above.

In the above-described embodiment, a solid electrolytic layer is formed by applying a conductive-polymer solution directly to the dielectric layer formed by oxidizing an anode metal. However, it is an option to conduct an application step (preliminary application step) for applying an organic solvent or a mixed solvent of an organic solvent and water to the dielectric layer prior to an application of the conductive-polymer solution.

Examples of an organic solvent used for a preliminary application are those organic solvents listed above for preparing a conductive-polymer solution. When a mixed solvent is used in a preliminary application step, the amount of the organic solvent in 100 mass % of the mixed solvent is preferred to be no less than 10 mass %.

In addition, examples of the method for applying an organic solvent or a mixed solvent in the preliminary application step are those various application methods listed above as the method for applying a conductive-polymer solution.

In such an embodiment, after the preliminary application step is conducted, a solid electrolytic layer is formed by applying (application step) a conductive-polymer solution containing the conductive polymer to a dielectric layer with a coated organic solvent or mixed solvent, followed by drying (drying step) the coated conductive-polymer solution.

When a preliminary application step is conducted, the conductive polymer contained in a conductive-polymer solution used for a subsequent application step is not always required to satisfy condition (A) above, nor is the conductive-polymer solution always required to satisfy condition (B) above. That is thought to be because even when using a conductive-polymer solution containing a conductive polymer that does not satisfy condition (A) above or a conductive-polymer solution that does not satisfy condition (B) above, the conductive polymer is not deposited on the surface of a dielectric layer but is impregnated into its fine irregularities, since preliminary application enhances the wettability of the conductive-polymer solution on the anode metal with a dielectric layer or on the separator provided in a later-described rolled-type solid electrolytic capacitor.

However, to enhance impregnation of the conductive polymer, it is preferred to use a conductive-polymer solution which contains a conductive polymer that satisfies condition (A) above and which meets condition (B) above. It is further preferred to adjust the amount of the conductive polymer in a conductive-polymer solution to no greater than 9 mass %, and the surface tension of a conductive polymer solution to less than 67 mN/m.

The solid electrolytic capacitor of the present invention is not limited to that described in the embodiment above.

A stacked solid electrolytic capacitor is described above. The solid electrolytic capacitor of the present invention may have a separator between the anode metal (anode) on which a dielectric layer is formed, a graphite layer and a metal layer (cathode). An example of a solid electrolytic capacitor with a separator provided between an anode and a cathode is a rolled-type solid electrolytic capacitor 20 as shown in FIG. 2.

Figure 2:
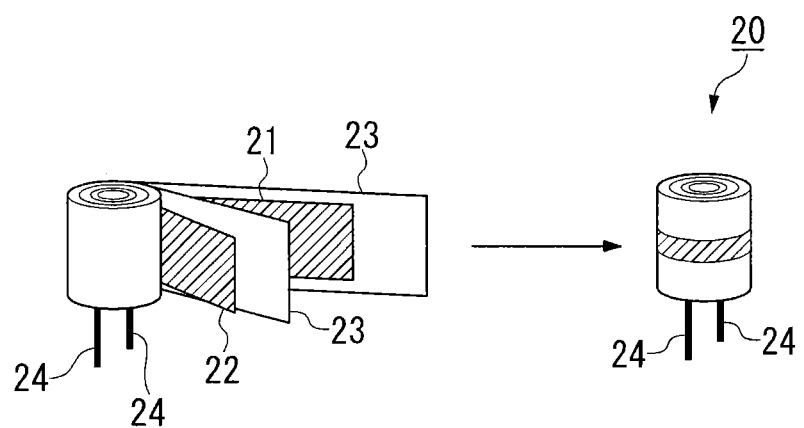
FIG. 2 schematically shows perspective views of another example of the solid electrolytic capacitor according to the embodiment of the present invention.

In FIG. 2, reference number 21 is referred to as an "anode," number 22 as a "cathode" and number 23 as a "separator."

A rolled-type solid electrolytic capacitor 20 is formed by providing separator 23 between anode 21 and cathode 22, which is then rolled to form a rolled-type body, and by forming a solid electrolytic layer (not shown) on the dielectric layer formed by oxidizing the anode metal, the same as in the above stacked solid electrolytic capacitor, followed by connecting anode 21 and cathode 22 to external terminals 24 and by forming an exterior. When a conductive-polymer solution is applied on the dielectric layer, dip coating is most preferred.

In addition, after separator 23 is provided between anode 21 and cathode 22, it is an option to form a solid electrolytic layer on the dielectric layer on the anode metal, the same as in the above stacked solid electrolytic capacitor, and then to wind those layers so as to form a rolled-type body.

As the material used for the separator 23 in a rolled-type solid electrolytic capacitor 20, fiber, paper, polyethylene terephthalate and the like are listed.

Also, a separator 23 may occasionally be impregnated with insulating oil. Examples of such insulating oil are electrical insulation oils such as mineral oil, diallyl ethane oil, alkylbenzene oil, aliphatic ester oil (oleic acid ester, fumaric acid ester, for example), aromatic ester oil (phthalate, for example), polycyclic aromatic oil, silicone oil and the like, or a combination of such oils.

EXAMPLES

In the following, examples of the present invention are described specifically. However, the present invention is not limited to those examples.
<Manufacturing Conductive Polymer>
A-1: Manufacturing poly(2-sulfo-5-methoxy-1,4-iminophenylene)

One hundred mmol of 2-aminoanisole-4-sulfonic acid was dissolved and stirred in 25° C. water containing 100 mmol of triethylamine. Into that solution, 100 mmol of ammonium peroxodisulfate was dropped. After the dropping was completed, the solution was further stirred at 25° C. for 12 hours. The reaction product was filtered, washed and dried. Accordingly, 15 grams of powdered poly(2-sulfo-5-methoxy-1,4-iminophenylene) (A-1) was obtained. The volume average particle size of (A-1) was 0.95 nm, and the volume resistivity was 9.0 Ω·cm. In addition, the mass average molecular weight obtained through gel permeation chromatography (GPC) in terms of sodium polystyrene sulfonate was approximately 10000.

The volume average particle size of (A-1) was obtained as follows.

First, a conductive-polymer solution with a concentration of 1 mass % of (A-1) is prepared, the particle size distribution was obtained by a dynamic light-scattering method using a dynamic light-scattering particle size analyzer ("Nanotrack UPA-UT" made by Nikkiso Co., Ltd.), and by correcting it with the viscosity of pure water. Out of one or more peaks, the volume average particle size was calculated from the distribution that includes the peak of the smallest particle size, and was set as the average particle size of the conductive polymer.

Since the particle size distribution of (A-1) by a dynamic light scattering method included only one peak, after correcting the value with the viscosity of pure water, that distribution was used for obtaining the volume average particle size of the smallest particle size distribution.
<Preparing Conductive-Polymer Solutions (B-1 to B-21)>
*B-1: prepared by combining A-1 (3 mass %) and water (97 mass %) as a solvent.

*B-2: prepared by combining A-1 (3 mass %), dioctyl sodium sulfosuccinate ("PELEX OT-P" made by Kao Corp.) (0.1 mass %) as a surfactant, and water (96.9 mass %) as a solvent.

*B-3: prepared by combining A-1 (3 mass %) and a mixed solvent of water and isopropyl alcohol (IPA) (mass ratio of 4:1) as a solvent (97 mass %).

*B-4: prepared by combining A-1 (5 mass %) and a mixed solvent of water and IPA (mass ratio of 4:1) as a solvent (95 mass %).

*B-5: prepared by combining A-1 (8 mass %) and water (92 mass %) as a solvent.

*B-6: prepared by combining A-1 (10 mass %), dioctyl sodium sulfosuccinate (0.1 mass %) as a surfactant, and water (89.9 mass %) as a solvent.

*B-7: prepared by combining A-1 (5 mass %), dioctyl sodium sulfosuccinate (0.5 mass %) as a surfactant, and water (94.5 mass %) as a solvent.

*B-8: prepared by combining A-1 (8 mass %) and a mixed solvent of water and methanol (MeOH) (mass ratio of 1:1) as a solvent (92 mass %).

*B-9: prepared by combining A-1 (10 mass %) and water (90 mass %) as a solvent.

*B-10: prepared by combining A-1 (9.1 mass %) and water (90.9 mass %) as a solvent.

*B-11: prepared by combining A-1 (4.8 mass %) and a mixed solvent of water and IPA (mass ratio of 1:1) as a solvent (95.2 mass %).

*B-12: prepared by combining A-1 (4.8 mass %) and a mixed solvent of water and acetone (mass ratio of 1:1) as a solvent (95.2 mass %).

*B-13: prepared by combining A-1 (4.8 mass %) and a mixed solvent of water and MeOH (mass ratio of 1:1) as a solvent (95.2 mass %).

*B-14: prepared by combining A-1 (4.8 mass %) and a mixed solvent of water and MeOH (mass ratio of 9:1) as a solvent (95.2 mass %).

*B-15: prepared by combining A-1 (4.8 mass %) and a mixed solvent of water and MeOH (mass ratio of 3:1) as a solvent (95.2 mass %).

*B-16: prepared by combining A-1 (4.8 mass %), dioctyl sodium sulfosuccinate (0.5 mass %) as a surfactant, and water (94.7 mass %) as a solvent.

*B-17: prepared by combining A-1 (4.8 mass %) and water (95.2 mass %) as a solvent.

*B-18: prepared by combining A-1 (2.9 mass %) and a mixed solvent of water and MeOH (mass ratio of 4:1) as a solvent (97.1 mass %).

*B-19: prepared by combining A-1 (2.9 mass %), dioctyl sodium sulfosuccinate (0.1 mass %) as a surfactant, and water (97.0 mass %) as a solvent.

*B-20: prepared by combining A-1 (2.9 mass %) and a mixed solvent of water and IPA (mass ratio of 4:1) as a solvent (97.1 mass %).

*B-21: PEDOT (poly(3,4-ethylenedioxythiophene)) solution ("Clevios™ PH 510"), a volume average particle size of PEDOT at 26.7 nm, and a concentration of 1.2 mass %.

In the above, (A-1) was dissolved in solvents in (B-1) through (B-20); however, in (B-21) PEDOT was not dissolved but was dispersed in the solvent. The volume average particle size of PEDOT was obtained by the same method as for (A-1).
(Measuring Surface Tension of Conductive-Polymer Solution)

Surface tension was measured in each of conductive-polymer solutions (B-1 to B-21) by a plate method (Wilhelmy method) using an automated surface tension meter ("CBVP-Z" made by Kyowa Interface Science Co., Ltd.). The results are shown in Table 1.

That is, the gauge (a platinum plate) is immersed in a solution to be measured, and when the force by which the solution pulls the gauge (surface tension) is balanced with the force of the spring to which the gauge is fixed, the surface tension is measured from the displacement at which the gauge is sunk in the solution.

(Measuring Rate of Exhibited Capacitance)

First, using an aluminum foil having an electrical capacitance per unit area of 95 µF/cm², a dielectric layer was formed by oxidizing the aluminum foil surface the same as in test piece 2. The aluminum foil was immersed in an ammonium adipate solution with a concentration of 3 mass %, the electrical capacitance in the liquid (maximum electrical capacitance (Cw)) at 120 Hz was measured using an

TABLE 1

| conductive-polymer solution | conductive polymer | | | surfactant | solvent | | surface tension (mN/m) |
|---|---|---|---|---|---|---|---|
| | type | volume average particle size (nm) | amount (mass %) | amount (mass %) | type | amount (mass %) | |
| B-1 | A-1 | 0.95 | 3.0 | 0 | water | 97.0 | 67.0 |
| B-2 | A-1 | 0.95 | 3.0 | 0.1 | water | 96.9 | 29.7 |
| B-3 | A-1 | 0.95 | 3.0 | 0 | water:IPA = 4:1 | 97.0 | 41.0 |
| B-4 | A-1 | 0.95 | 5.0 | 0 | water:IPA = 4:1 | 95.0 | 44.0 |
| B-5 | A-1 | 0.95 | 8.0 | 0 | water | 92.0 | 67.0 |
| B-6 | A-1 | 0.95 | 10 | 0.1 | water | 89.9 | 29.7 |
| B-7 | A-1 | 0.95 | 5.0 | 0.5 | water | 94.5 | 21.5 |
| B-8 | A-1 | 0.95 | 8.0 | 0 | water:MeOH = 1:1 | 92.0 | 32.5 |
| B-9 | A-1 | 0.95 | 10 | 0 | water | 90.0 | 67.0 |
| B-10 | A-1 | 0.95 | 9.1 | 0 | water | 90.9 | 67.0 |
| B-11 | A-1 | 0.95 | 4.8 | 0 | water:IPA = 1:1 | 95.2 | 31.7 |
| B-12 | A-1 | 0.95 | 4.8 | 0 | water:acetone = 1:1 | 95.2 | 33.2 |
| B-13 | A-1 | 0.95 | 4.8 | 0 | water:MeOH = 1:1 | 95.2 | 32.5 |
| B-14 | A-1 | 0.95 | 4.8 | 0 | water:MeOH = 9:1 | 95.2 | 56.0 |
| B-15 | A-1 | 0.95 | 4.8 | 0 | water:MeOH = 3:1 | 95.2 | 41.3 |
| B-16 | A-1 | 0.95 | 4.8 | 0.5 | water | 94.7 | 21.5 |
| B-17 | A-1 | 0.95 | 4.8 | 0 | water | 95.2 | 67.0 |
| B-18 | A-1 | 0.95 | 2.9 | 0 | water:MeOH = 4:1 | 97.1 | 43.1 |
| B19 | A-1 | 0.95 | 2.9 | 0.1 | water | 97.0 | 29.7 |
| B-20 | A-1 | 0.95 | 2.9 | 0 | water:IPA = 4:1 | 97.1 | 44.1 |
| B-21 | PEDOT | 26.7 | 1.2 | 0 | water | 98.8 | 67.0 |

Example 1

(Preparing Test Piece 1: Sintered Tantalum Substrate)

A tantalum element having a dielectric layer ("tantalum capacitor anode element (pellet)" made by Pure Material Laboratory, Ltd.) was immersed in conductive-polymer solution (B-2) for 5 minutes. Then, the tantalum element was taken out and dried by heating at 130° C. for 15 minutes to form a solid electrolytic layer on the dielectric layer (the thickness from the surface of the dielectric layer was approximately 10 µm). The prepared substrate was set as test piece 1.

(Preparing Test Piece 2: Aluminum Foil Substrate)

A rolled-type aluminum capacitor was cut into a rectangle, which was then subjected to anode oxidation under conditions of voltage at 5.7 V and temperature of 70° C. for 120 minutes in an ammonium adipate solution with a concentration of 3 mass %. Accordingly, a dielectric layer was formed on the aluminum foil surface, and an aluminum element was obtained. Next, the aluminum element was immersed in conductive-polymer solution (B-2) for 5 minutes. Then, the aluminum element was taken out and dried by heating at 105° C. for 30 minutes to form a solid electrolytic layer on the dielectric layer (the thickness from the surface of the dielectric layer was approximately 10 µm). The prepared substrate was set as test piece 2.

(Preparing Test Piece 3: Rolled-Type Aluminum Substrate)

A rolled-type aluminum element was immersed in conductive-polymer solution (B-2) for 5 minutes. Then, the rolled-type aluminum element was taken out and dried by heating at 105° C. for 30 minutes to form a solid electrolytic layer on the dielectric layer. The prepared substrate was set as test piece 3.

LCR meter ("E4980A, Precision LCR Meter" made by Agilent Technologies). The maximum electrical capacitance (Cw) was 94 µF.

Separately, using an aluminum foil with an electrical capacitance per unit area of 95 µF/cm², a dielectric layer was formed by oxidizing the aluminum foil surface the same as in test piece 2, and a solid electrolytic layer was formed on the dielectric layer (the thickness from the surface of the dielectric layer was approximately 10 µm). Next, a graphite layer and aluminum electrode were formed on the solid electrolytic layer, and a cathode lead pin was connected to the aluminum electrode. Accordingly, a stacked aluminum solid electrolytic capacitor with a voltage rating of 6.3 V was prepared.

The electrical capacitance (Cs) at 120 Hz of the obtained stacked aluminum solid electrolytic capacitor was measured using an LCR meter ("E4980A, Precision LCR Meter" made by Agilent Technologies). The formula below was used to calculate the rate of exhibited capacitance of a stacked aluminum solid electrolytic capacitor. The results are shown in Table 2.

$$\text{rate of exhibited capacitance (\%)} = (Cs/Cw) \times 100 \qquad \text{(i)}$$

(Evaluation of Impregnation Results)

The obtained test pieces 1 to 3 were cut in a vertical direction (lamination direction) and observed at an observation magnification of 1000 to 30000 by a scanning electron microscope ("S-4300SE/N" made by Hitachi High-Technologies Corporation). For each piece, the impregnation of a conductive polymer into the fine irregularities of a dielectric layer was observed and evaluated using evaluation criteria shown below.

⊚: the conductive polymer is sufficiently impregnated into the fine irregularities of the dielectric layer.

◯: the conductive polymer is impregnated into the fine irregularities of the dielectric layer.

Δ: impregnation of the conductive polymer in the fine irregularities of the dielectric layer is a bit insufficient.

x: impregnation of the conductive polymer in the fine irregularities of the dielectric layer is insufficient.

The total evaluation of test pieces 1 to 3 was conducted by allotting points such as 5 points for "⊚"; 3 points for "◯"; 1 point for "Δ"; and 0 point for "x". Those evaluation results are shown in Table 2.

Examples 2 to 15, 18 to 20, Comparative Examples 1 to 3

Test pieces 1 to 3 were each prepared the same as in Example 1 except for using conductive-polymer solutions as respectively shown in Table 2, and the rate of exhibited capacitance and the impregnation results were each evaluated. The results are shown in Table 2.

Example 16

Test pieces 1 to 3 were each prepared the same as in Example 1 except that conductive-polymer solution (B-1) was used, and the test pieces were immersed in IPA for one minute before the tantalum element, aluminum element and rolled-type aluminum element were immersed in the conductive-polymer solution. Then, the rate of exhibited capacitance and the impregnation results were evaluated. The results are shown in Table 2.

Example 17

Test pieces 1 to 3 were each prepared the same as in Example 1 except that conductive-polymer solution (B-1) was used, and the test pieces were immersed in MeOH for one minute before the tantalum element, aluminum element and rolled-type aluminum element were immersed in the conductive-polymer solution. Then, the rate of exhibited capacitance and the impregnation results were evaluated. The results are shown in Table 2.

TABLE 2

| | | conductive-polymer solution | | | | | measurement of exhibited capacitance | | evaluation of impregnation results | | | |
|---|---|---|---|---|---|---|---|---|---|---|---|---|
| | | conductive polymer | | | | | | | | | | |
| | | type | volume average particle size (nm) | amount (mass %) | surface tension (mN/m) | preliminary impregnation | capacitance (μF) | rate of exhibited capacitance (%) | test piece 1 stacked Ta substrate | test piece 2 stacked Al substrate | test piece 3 wound Al substrate | total evaluation |
| ex- ample | 1 | B-2 | 0.95 | 3.0 | 29.7 | no | 79.4 | 84 | ⊚ | ⊚ | ⊚ | 15 |
| | 2 | B-3 | 0.95 | 3.0 | 41.0 | no | 94.4 | 100 | ⊚ | ⊚ | ⊚ | 15 |
| | 3 | B-4 | 0.95 | 5.0 | 44.0 | no | 90.3 | 96 | ⊚ | ⊚ | ⊚ | 15 |
| | 4 | B-6 | 0.95 | 10 | 29.7 | no | 70.4 | 75 | ⊚ | ⊚ | ⊚ | 15 |
| | 5 | B-7 | 0.05 | 5.0 | 21.5 | no | 66.1 | 70 | ⊚ | ⊚ | ⊚ | 15 |
| | 6 | B-8 | 0.95 | 8.0 | 32.5 | no | 69.2 | 74 | ⊚ | ⊚ | ⊚ | 15 |
| | 7 | B-11 | 0.95 | 4.8 | 31.7 | no | 70.9 | 75 | ⊚ | ⊚ | ⊚ | 15 |
| | 8 | B-12 | 0.95 | 4.8 | 33.2 | no | 68.4 | 73 | ⊚ | ⊚ | ⊚ | 15 |
| | 9 | B-13 | 0.95 | 4.8 | 32.5 | no | 71.3 | 76 | ⊚ | ⊚ | ⊚ | 15 |
| | 10 | B-14 | 0.95 | 4.8 | 56.0 | no | 70.3 | 75 | ⊚ | ⊚ | ⊚ | 15 |
| | 11 | B-15 | 0.95 | 4.8 | 41.3 | no | 68.4 | 73 | ⊚ | ⊚ | ⊚ | 15 |
| | 12 | B-16 | 0.95 | 4.8 | 21.5 | no | 67.6 | 72 | ⊚ | ⊚ | ⊚ | 15 |
| | 13 | B-18 | 0.95 | 2.9 | 43.1 | no | 78.8 | 84 | ⊚ | ⊚ | ⊚ | 15 |
| | 14 | B-19 | 0.95 | 2.9 | 29.7 | no | 81.2 | 86 | ⊚ | ⊚ | ⊚ | 15 |
| | 15 | B-20 | 0.95 | 2.9 | 41.1 | no | 83.0 | 88 | ⊚ | ⊚ | ⊚ | 15 |
| | 16 | B-1 | 0.95 | 3.0 | 67.0 | yes (IPA) | 84.6 | 90 | ⊚ | ⊚ | ⊚ | 15 |
| | 17 | B-1 | 0.95 | 3.0 | 67.0 | yes (MeOH) | 82.1 | 87 | ⊚ | ⊚ | ⊚ | 15 |
| | 18 | B-1 | 0.95 | 3.0 | 67.0 | no | 88.2 | 94 | Δ | ⊚ | Δ | 7 |
| | 19 | B-5 | 0.95 | 8.0 | 67.0 | no | 71.1 | 76 | Δ | ⊚ | Δ | 7 |
| | 20 | B-17 | 0.95 | 4.8 | 67.0 | no | 84.7 | 90 | Δ | ⊚ | Δ | 7 |
| comp. ex- ample | 1 | B-9 | 0.95 | 10 | 67.0 | no | 60.2 | 64 | X | ◯ | X | 3 |
| | 2 | B-10 | 0.95 | 9.1 | 67.0 | no | 62.0 | 66 | X | ◯ | X | 3 |
| | 3 | B-21 | 26.7 | 1.2 | 67.0 | no | 56.7 | 60 | X | ◯ | X | 3 |

As clearly indicated from the results shown in Table 2, the conductive polymer was impregnated in the irregularities of the dielectric layer in each example.

Also, when Examples 16 to 18 are compared, the impregnation results were better evaluated in Examples 16 and 17, for which a preliminary impregnation step was performed.

By contrast, in Comparative Examples 1 and 2 prepared by using a conductive-polymer solution that did not satisfy condition (B), and in Comparative Example 3 prepared by using a conductive-polymer solution which contained a conductive polymer that did not satisfy condition (A) and which did not meet condition (B), it was found that the conductive polymer was not well impregnated into the fine irregularities of the dielectric layer.

DESCRIPTION OF NUMERICAL REFERENCES 10 solid electrolytic capacitor
11 anode metal
12 dielectric layer
13 solid electrolytic layer
14 graphite layer
15 metal layer
20 solid electrolytic capacitor
21 anode
22 cathode
23 separator
24 external terminal

What is claimed is:

1. A solid electrolytic capacitor, comprising:
a solid electrolytic layer; and
a dielectric layer on which the solid electrolytic layer is formed,
wherein the solid electrolytic layer is formed by a process comprising applying and drying a conductive-polymer solution comprising a conductive polymer on the dielectric layer,
the dielectric layer is formed by a process comprising oxidizing a surface of an anode metal,
when particle size distributions of the conductive polymer are measured by a dynamic light-scattering method using a test conductive-polymer solution comprising 1 mass % of the conductive polymer, among one or a plurality of peaks of the particle size distributions, a volume average particle size in the distribution including a peak of the smallest particle size is smaller than 26 nm, and
when a test stacked aluminum electrolytic capacitor comprising the solid electrolytic layer and a test dielectric layer is formed, the test stacked aluminum electrolytic capacitor has a rate of exhibited capacitance of no less than 70%, wherein the solid electrolytic layer is formed by applying and drying the conductive-polymer solution on the test dielectric layer and the test dielectric layer is formed by oxidizing a surface of aluminum having an electrical capacitance of 95 µF/cm².

2. The solid electrolytic capacitor of claim 1, wherein the conductive-polymer solution includes the conductive polymer in an amount of 9 mass % or less.

3. The solid electrolytic capacitor of claim 2, wherein the conductive-polymer comprises a repeating unit having a formula (1),

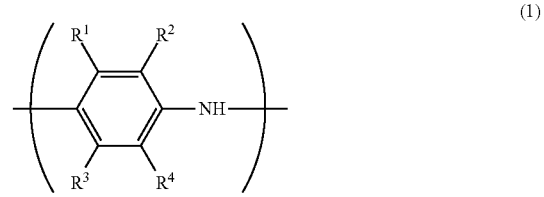

wherein $R^1$ to $R^4$ are each independently —H, a straight or branched chain alkyl group having 1 to 24 carbon atoms, a straight or branched chain alkoxy group having 1 to 24 carbon atoms, an acidic group or a salt thereof, a hydroxyl group, a nitro group, —F, —Cl, —Br or —I, provided that at least one of $R^1$ to $R^4$ is an acidic group or a salt thereof, the acidic group being either a sulfonic group or a carboxylic group.

4. The solid electrolytic capacitor of claim 1, wherein the conductive-polymer solution has a surface tension of less than 67 mN/m.

5. The solid electrolytic capacitor of claim 4, wherein the conductive-polymer comprises a repeating unit having a formula (1),

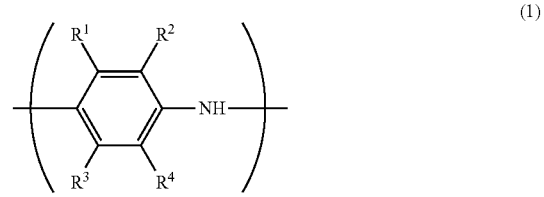

wherein $R^1$ to $R^4$ are each independently —H, a straight or branched chain alkyl group having 1 to 24 carbon atoms, a straight or branched chain alkoxy group having 1 to 24 carbon atoms, an acidic group or a salt thereof, a hydroxyl group, a nitro group, —F, —Cl, —Br or —I, provided that at least one of $R^1$ to $R^4$ is an acidic group or a salt thereof, the acidic group being either a sulfonic group or a carboxylic group.

6. The solid electrolytic capacitor of claim 1, wherein the conductive-polymer solution further comprises a surfactant.

7. The solid electrolytic capacitor of claim 6, wherein the conductive-polymer comprises a repeating unit having a formula (1),

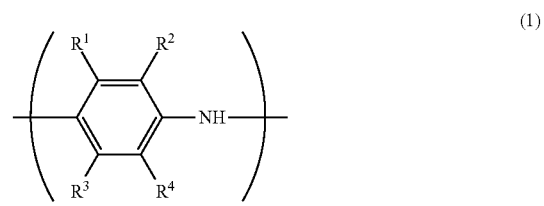

wherein $R^1$ to $R^4$ are each independently —H, a straight or branched chain alkyl group having 1 to 24 carbon atoms, a straight or branched chain alkoxy group having 1 to 24 carbon atoms, an acidic group or a salt thereof, a hydroxyl group, a nitro group, —F, —Cl, —Br or —I, provided that at least one out of $R^1$ to $R^4$ is an acidic group or a salt thereof, the acidic group being either a sulfonic group or a carboxylic group.

8. The solid electrolytic capacitor of claim 1, wherein the conductive-polymer comprises a repeating unit having a formula (1),

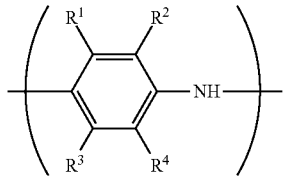

(1)

wherein $R^1$ to $R^4$ are each independently —H, a straight or branched chain alkyl group having 1 to 24 carbon atoms, a straight or branched chain alkoxy group having 1 to 24 carbon atoms, an acidic group or a salt thereof, a hydroxyl group, a nitro group, —F, —Cl, —Br, or —I, provided that at least one of $R^1$ to $R^4$ is an acidic group or a salt thereof, the acidic group being either a sulfonic group or a carboxylic group.

9. The solid electrolytic capacitor of claim 1, wherein the anode metal comprises at least one of tantalum and aluminum.

10. The solid electrolytic capacitor of claim 1, wherein, when the particle size distributions of the conductive polymer are measured by the dynamic light-scattering method using the test conductive-polymer solution, among one or a plurality of peaks of the particle size distributions, the volume average particle size in the distribution including the peak of the smallest particle size is 5 nm or less.

11. The solid electrolytic capacitor of claim 1, wherein the conductive-polymer solution includes the conductive polymer in an amount of from 0.1 to 5 mass %.

12. A method for manufacturing a solid electrolytic capacitor, the method comprising:
applying a conductive-polymer solution comprising a conductive polymer to a dielectric layer formed by a process comprising oxidizing a surface of an anode metal; and
drying the conductive-polymer solution such that a solid electrolytic layer is formed on the dielectric layer,
wherein, when particle size distributions of the conductive polymer are measured by a dynamic light-scattering method using a test conductive-polymer solution comprising 1 mass % of the conductive polymer, among one or a plurality of peaks of the particle size distributions, a volume average particle size in the distribution including a peak of the smallest particle size is smaller than 26 nm, and
when a test stacked aluminum electrolytic capacitor comprising the solid electrolytic layer and a test dielectric layer is formed, the test stacked aluminum electrolytic capacitor has a rate of exhibited capacitance of no less than 70%, wherein the solid electrolytic layer is formed by applying and drying the conductive-polymer solution on the test dielectric layer and the test dielectric layer is formed by oxidizing a surface of aluminum having an electrical capacitance of 95 $\mu F/cm^2$.

13. The method of claim 12, wherein the conductive-polymer solution includes the conductive polymer in an amount of 9 mass % or less.

14. The method of claim 12, wherein the conductive-polymer solution has a surface tension of less than 67 mN/m.

15. A method for manufacturing a solid electrolytic capacitor, comprising:
applying an organic solvent, or a mixed solvent comprising water and an organic solvent, to a dielectric layer formed by a process comprising oxidizing a surface of an anode metal;
applying a conductive-polymer solution comprising a conductive polymer to the dielectric layer on which the organic solvent or the mixed solvent is applied; and
drying the conductive-polymer solution such that a solid electrolytic layer is formed on the dielectric layer,
wherein, when a test stacked aluminum electrolytic capacitor comprising the solid electrolytic layer and a test dielectric layer is formed, the test stacked aluminum electrolytic capacitor has a rate of exhibited capacitance of no less than 70%, wherein the solid electrolytic layer is formed by applying and drying the conductive-polymer solution on the test dielectric layer and the test dielectric layer is formed by oxidizing a surface of aluminum having an electrical capacitance of 95 $\mu F/cm^2$.

16. The method of claim 15, wherein, when particle size distributions of the conductive polymer are measured by a dynamic light-scattering method using a test conductive-polymer solution comprising 1 mass % of the conductive polymer, among one or a plurality of peaks of the particle size distributions, a volume average particle size in the distribution including a peak of the smallest particle size is smaller than 26 nm.

17. The method of claim 16, wherein the conductive-polymer solution includes the conductive polymer in an amount of 9 mass % or less.

18. The method of claim 16, wherein the conductive-polymer solution has a surface tension of less than 67 mN/m.

19. The method of claim 15, wherein the conductive-polymer solution includes the conductive polymer in an amount of 9 mass % or less.

20. The method of claim 15, wherein the conductive-polymer solution has a surface tension of less than 67 mN/m.

* * * * *